(12) United States Patent
Hirotani

(10) Patent No.: US 7,328,918 B2
(45) Date of Patent: Feb. 12, 2008

(54) SEAT BELT DEVICE FOR VEHICLE

(75) Inventor: Yasunari Hirotani, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 398 days.

(21) Appl. No.: 10/863,293

(22) Filed: Jun. 9, 2004

(65) Prior Publication Data

US 2005/0017497 A1    Jan. 27, 2005

(30) Foreign Application Priority Data

| Jul. 24, 2003 | (JP) | ............................ 2003-200984 |
| Jul. 24, 2003 | (JP) | ............................ 2003-200985 |
| Jul. 24, 2003 | (JP) | ............................ 2003-200986 |

(51) Int. Cl.
*B60R 22/024* (2006.01)
*B60R 22/008* (2006.01)

(52) U.S. Cl. ...................... 280/803; 280/807; 297/468; 297/483; 296/208; 296/210

(58) Field of Classification Search ............. 280/801.1, 280/803, 807, 808; 297/468, 483; 296/208, 296/214

See application file for complete search history.

(56) References Cited

U.S. PATENT DOCUMENTS 3,542,425 A * 11/1970 Pringle ........................ 297/474
5,399,121 A * 3/1995 Gray et al. ................... 454/137
6,234,529 B1 * 5/2001 Ellison et al. ............... 280/808
6,334,628 B1 * 1/2002 Newball et al. ......... 280/801.1
6,474,586 B1 * 11/2002 Kapanka ................... 242/379.1

FOREIGN PATENT DOCUMENTS

| EP | 0890489 | 1/1999 |
| FR | 2701906 | 9/1994 |
| JP | 11198756 | 7/1999 |
| JP | 11222099 A | * 8/1999 |
| JP | 2000-001156 | 1/2000 |
| JP | 2000001155 A | * 1/2000 |
| JP | 2000095061 A | * 4/2000 |
| JP | 2002331907 | 11/2002 |
| JP | 2005225436 A | * 8/2005 |

* cited by examiner

*Primary Examiner*—Paul N. Dickson
*Assistant Examiner*—Timothy Wilhelm
(74) *Attorney, Agent, or Firm*—Nixon Peabody LLP; Donald R. Studebaker

(57) ABSTRACT

A seat belt device for a central portion of a rearmost row seat includes a retractor. The retractor is attached at a vehicle roof above a central passenger on the central seat portion of the rear row seat. More specifically, a pair of left and right roof rails are interconnected by a first reinforcement extending in a vehicle width direction before the central passenger, and the first reinforcement and a rear header are interconnected by a second reinforcement extending in a longitudinal direction. A retractor is attached at the first reinforcement. A seat belt withdrawn from the retractor is disposed so as to extend via a seat belt anchor disposed in the rear header.

15 Claims, 8 Drawing Sheets

SEAT BELT DEVICE FOR VEHICLE

BACKGROUND OF THE INVENTION

The present invention relates to a seat belt device for a vehicle.

There are vehicles including a rear row seat which is disposed behind a front row seat (a driver's seat and a passenger seat) and available for plural passengers sitting thereon in a vehicle width direction. Further, a three-passenger-sitting seat is known as such rear row seat, which includes a central seat portion for a passenger sitting at a central position thereof and side seat portions located at both sides of the central seat portion for two side-sitting passengers.

Meanwhile, seat belt devices are provided respectively for passengers sitting on the seat. In the above-described three-passenger-sitting seat, a seat belt device is also provided for a central passenger sitting on the central seat position of the rear row seat. Herein, the seat belt device for the central passenger is needed to be configured of a three-point type of seat belt recently.

Generally, the three-point type of seat belt has the following structure. Namely, a seat belt withdrawn from a seat belt retractor extends via a seat belt anchor disposed at a high position of a vehicle body, and a tip of the seat belt is normally connected with a first attaching portion as a fixing point to the vehicle body which is disposed at either one side of the above-described central seat portion. Meanwhile, there is provided a coupling member which is guided through the seat belt and capable of moving between the seat belt anchor and the first attaching portion, and the coupling member is coupled detachably to a second attaching portion as another fixing point to the vehicle body which is disposed at the other side of the above-described central seat portion. The seat belt anchor is disposed behind the passenger to be retrained and offset from the passenger in the vehicle width direction (normally, it is attached at a side wall member of vehicle body, such as a center pillar or a rear pillar, which is located at a side end portion of the vehicle). Further, the seat belt retractor is usually attached at the side end portion of the vehicle (side wall member of vehicle body), corresponding to a position of the seat belt anchor. Also, generally the above-described first attaching portion which the tip of the seat belt is normally connected with is located at a side of the side wall member of vehicle body, while the above-described second attaching portion is located at an inside of the vehicle body.

Herein, when the three-point type of seat belt device is applied to a passenger sitting on the central portion of the rear row seat, there may be a problem with the position of the seat belt retractor. This is because there exists no normal side wall member of vehicle body for attaching the retractor beside the passenger sitting on the central seat portion due to existence of the left and right seat portions. A structure in which a seat belt retractor for the central passenger on a rearmost seat is disposed in a corner portion (a space in a vehicle compartment) near an upper portion of a rear pillar is disclosed in Japanese Laid-Open Patent Publication No. 2000-1156. Namely, the patent publication discloses that there is provided a bracket which connects a rear end portion of a roof rail constituting a side edge portion of the roof with a side end portion of a rear header constituting a rear edge portion of the roof, and the retractor is attached at this bracket.

The structure disclosed in the above-described patent publication may be preferable in utilizing a dead space of a vehicle having an enough space in the corner portion near the upper end of the pillar in the vehicle compartment. However, it may be difficult from a design stand point to locate the retractor in this position for a vehicle which does not have enough space in the corner portion. Particularly, since the seat belt withdrawn from the retractor needs to extend toward the seat belt anchor disposed in a proper position for the central passenger on the rear row seat, spaces for locating not only the retractor but also the seat belt which is withdrawn from the retractor and extends toward the seat belt anchor should be considered. Accordingly, it may be actually impossible from a head-clearance-acquirement stand point as well to locate the retractor in this position for the vehicle not having enough space at this corner portion. In other words, it may be difficult that the technology disclosed in the patent publication can satisfy both proper vehicle design, particularly a rear part design of the vehicle behind the rear row seat, and acquirement of such enough head clearance.

SUMMARY OF THE INVENTION

The present invention has been devised in view of the above-mentioned problems, and an object of the present invention is to provide a set belt device for a vehicle that can satisfy acquirement of an enough head clearance for a passenger on a rear row seat and less restriction in a vehicle body designing around the rear row seat at a higher level, by providing a proper location of a seat belt retractor for a central passenger on the rear row seat.

In order to achieve the above-described object, the present invention provides a seat belt device for a vehicle, comprising a rear row seat disposed behind a front row seat including a driver's seat in a vehicle compartment, the rear row seat being available for plural passengers sitting in a vehicle width direction and including a central seat portion for a passenger sitting in a central position thereof, a seat belt device disposed for the passenger sitting on the central portion of the rear row seat and including a retractor for winding up a seat belt, wherein the retractor is fixed at a portion of a vehicle roof which is located before a head portion of the passenger sitting on the central portion of the rear row seat.

Accordingly, since the retractor is fixed at the portion of the vehicle roof which is located before and above the head portion of the passenger sitting on the central portion of the rear row seat, the retractor does not interfere with acquirement of enough head clearance for the central passenger and provides less restriction in the vehicle body designing around and behind the rear row seat.

According to a preferred embodiment of the present invention, the vehicle roof is protruded upward partially and the retractor is located in a space formed below the protruded portion of the vehicle roof. Accordingly, since the space below the protruded portion of the vehicle roof is used for a storage space for the retractor, an enough space of the head clearance can be provided properly.

According to another preferred embodiment of the present invention, the retractor is disposed obliquely such that the seat belt withdrawn from the retractor is inclined in a vehicle width direction. Accordingly, since the seat belt withdrawn from the retractor is directed straightly to the seat belt anchor by disposing the seat belt anchor at an appropriate location which is offset from the central passenger in the vehicle width direction, smooth withdrawal or winding of the seat belt can be obtained.

According to another preferred embodiment of the present invention, a pair of left-and-right roof rails, which extend in a longitudinal direction of the vehicle and constitute left-and-right side edge portions of the vehicle roof, are connected with each other by a first reinforcement extending in the vehicle width direction, and the retractor is fixed at the first reinforcement. Accordingly, since the first reinforcement strengthens the vehicle roof, a large tension force applied to the retractor via the seat belt during a vehicle collision in the longitudinal direction can be sustained preferably by the vehicle structure. Of course, an attaching portion of the retractor itself can be also increased sufficiently in rigidity thereof.

According to another preferred embodiment of the present invention, there is provided a second reinforcement which extends in the longitudinal direction of the vehicle and connects the first reinforcement with a rear header constituting a rear edge portion of the vehicle roof. Accordingly, the vehicle roof can be further strengthened by the second reinforcement. Particularly, the second reinforcement can sustain the large longitudinal tension force via the seat belt during the vehicle collision in the longitudinal direction.

According to another preferred embodiment of the present invention, the retractor is disposed obliquely such that the seat belt withdrawn from the retractor is inclined in a vehicle width direction, and the second reinforcement is disposed at a side which is opposite to a side where the seat belt is withdrawn with respect to the retractor. Accordingly, since the seat belt directed to the seat belt anchor from the retractor and the second reinforcement are disposed at different sides of the vehicle separately, putting the retractor therebetween, an enough head clearance can be acquired preferably without any interference between the seat belt and the second reinforcement.

According to another preferred embodiment of the present invention, there is provided a roof trim which covers the retractor from an inside of the vehicle compartment. Accordingly, a preferable appearance can be obtained with the retractor prevented from being seen from the inside of the vehicle compartment.

According to another preferred embodiment of the present invention, there is provided a shock absorbing member between the roof trim and the retractor. Accordingly, even if the passenger hits a head against the roof trim at the retractor by standing up imprudently, a head of the passenger can be properly protected by the shock absorbing member.

According to another preferred embodiment of the present invention, the retractor is disposed at a substantially central portion in the vehicle width direction, a seat belt anchor for making the seat belt withdrawn from the retractor return is disposed at a portion of the vehicle roof which is located behind the passenger sitting on the central portion of the rear row seat and offset from the vehicle center in the vehicle width direction, and the seat belt withdrawn from the retractor is inclined in a vehicle width direction so as to be directed to the seat belt anchor. Accordingly, since the retractor is located at the substantially center portion in the vehicle width direction, an enough head clearance for the passenger on the rear row seat can be obtained. Further, since the seat belt anchor is located in a proper position with respect to the central passenger, the seat belt withdrawn from the retractor can be straightly and smoothly directed to the seat belt anchor without bending it.

According to another preferred embodiment of the present invention, the seat belt device for the passenger sitting on the central portion of the rear row seat includes a first attaching portion and a second attaching portion as fixing portions to a vehicle body, the first and second attaching portions are disposed respectively at both sides of the central seat portion of the rear row seat in the vehicle width direction, the first attaching portion is located at a side of the seat belt anchor and the second attaching portion is located at an opposite side to the seat belt anchor, a tip of the seat belt which is withdrawn from the retractor and gets through the seat belt anchor is connected with the first attaching portion normally, and a coupling member which is guided through the seat belt and capable of moving between the seat belt anchor and the first attaching portion is coupled detachably to the second attaching portion. Accordingly, a specific and preferable structure for the three-point type of seat belt device can be provided.

According to another preferred embodiment of the present invention, the rear row seat is configured to be a rearmost row seat. Accordingly, less restriction in designing the vehicle body around a rear end portion of the vehicle can be provided.

According to another preferred embodiment of the present invention, there is provided a reinforcement which connects the retractor with a rear header constituting a rear edge portion of the vehicle roof. Accordingly, since the retractor and the rear header as a vehicle rigidity member are connected by the reinforcement, attaching rigidity of the retractor to the vehicle body can be obtained sufficiently and thereby a large tension force occurring via the seat belt during a head-on vehicle collision can be sustained properly.

According to another preferred embodiment of the present invention, the reinforcement includes a first reinforcement which extends in the vehicle width direction and connects left-and-right roof rails with each other which constitute left-and-right side edge portions of the vehicle roof and a second reinforcement which extends in a longitudinal direction of the vehicle and connects the first reinforcement with the rear header. Accordingly, since a specific structure of the reinforcement, in which the first reinforcement connects the left-and-right roof rails with each other as vehicle rigidity members and the second reinforcement connects the first reinforcement and the rear header as a vehicle rigidity member, is provided, the retractor can be attached at the vehicle body in an extremely preferable state with high rigidity as a whole.

According to another preferred embodiment of the present invention, the retractor is fixed at the first reinforcement. Accordingly, since the retractor is fixed at the first reinforcement as a rigidity member, attaching rigidity of the retractor can be obtained sufficiently.

According to another preferred embodiment of the present invention, the seat belt withdrawn from the retractor is configured so as to get through between the vehicle roof and the reinforcement. Accordingly, the seat belt can be disposed preferably in a higher position along the vehicle roof.

According to another preferred embodiment of the present invention, a seat belt anchor is fixed at the rear header, and the seat belt withdrawn from the retractor is configured so as to get through the seat belt anchor. Accordingly, a specific structure of the seat belt withdrawn from the retractor with respect to the seat belt anchor is provided, and since the seat belt anchor is attached at the rear header as a vehicle rigidity member, a large tension force occurring via the seat belt during a head-on vehicle collision can be sustained properly.

According to another preferred embodiment of the present invention, the seat belt anchor is disposed in the rear header. Accordingly, since the seat belt anchor is disposed in the rear header by utilizing a space in the rear header properly, the seat belt anchor itself may not interfere with a head clearance.

According to another preferred embodiment of the present invention, the retractor is disposed in substantially the same position as the passenger sitting to be restrained in the vehicle width direction, the seat belt anchor is disposed so as to be offset from the retractor in the vehicle width direction, and the retractor is disposed obliquely such that seat belt withdrawn straightly from the retractor is directed to the offset seat belt anchor. Accordingly, a movement of the seat belt can be made smooth between the retractor and the seat belt anchor, with locating the seat belt anchor properly with respect to the passenger to be restrained.

According to another preferred embodiment of the present invention, there is provided a trim member which covers the retractor and the reinforcement from an inside of the vehicle compartment. Accordingly, a preferable appearance can be obtained with the retractor and the reinforcement prevented from being seen from the inside of the vehicle compartment.

According to another preferred embodiment of the present invention, there is provided a set belt anchor which the seat belt withdrawn from the retractor get through, and the seat belt anchor is fixed at a rear header constituting a rear edge portion of the vehicle roof. Accordingly, since the retractor is disposed at the portion of the vehicle roof which is before and above the head portion of the passenger on the rear row seat and the seat belt anchor is disposed in the rear header by utilizing the space in the rear header properly, the retractor and the seat belt anchor may not interfere with a head clearance above the passenger on the rear row seat. Further, since the seat belt anchor is fixed at the rear header as a vehicle rigidity member, a large tension force occurring via the seat belt during a head-on vehicle collision can be sustained properly by not only the retractor but the seat belt anchor.

According to another preferred embodiment of the present invention, the retractor is disposed in substantially the same position as the passenger sitting to be restrained in the vehicle width direction, the seat belt anchor is disposed so as to be offset from the retractor in the vehicle width direction, and the retractor is disposed obliquely such that the seat belt withdrawn straightly from the retractor is directed to the offset seat belt anchor. Accordingly, a movement of the seat belt can be made smooth between the retractor and the seat belt anchor, with locating the seat belt anchor properly with respect to the passenger to be restrained.

According to another preferred embodiment of the present invention, there is provided an air conditioning duct which extends in the vehicle width direction between the retractor and a rear header constituting a rear edge portion of the vehicle roof. Accordingly, the air conditioning duct extending in the vehicle width direction along the rear header can be disposed preferably without any interference with the retractor.

According to another preferred embodiment of the present invention, the seat belt withdrawn from the retractor is disposed so as to extend between the vehicle roof and the air conditioning duct. Accordingly, the seat belt can be disposed properly by utilizing a gap between the vehicle roof and the air conditioning duct.

According to another preferred embodiment of the present invention, there is provided a guide portion for guiding the seat belt withdrawn from the retractor on an upper face of the air conditioning duct. Accordingly, the air conditioning duct functions as a guide for the seat belt, and thereby the seat belt can be prevented from moving improperly in the vertical or lateral directions.

According to another preferred embodiment of the present invention, there is provided a trim member which covers the retractor and the air conditioning duct from an inside of the vehicle compartment. Accordingly, a preferable appearance can be obtained with the retractor and the air conditioning duct prevented from being seen from the inside of the vehicle compartment.

According to another preferred embodiment of the present invention, there is provided a shock absorbing member between the retractor and the trim member. Accordingly, even if the passenger hits a head against the roof trim at the retractor by standing up imprudently, a head of the passenger can be properly protected by the shock absorbing member.

According to another preferred embodiment of the present invention, there is provided a reinforcement which connects the retractor with a rear header constituting a rear edge portion of the vehicle roof, and the air conditioning duct is supported at the reinforcement. Accordingly, the air conditioning duct can be supported firmly by utilizing the reinforcement. Further, a large tension force occurring via the seat belt during a vehicle collision in the longitudinal direction can be sustained properly by the reinforcement and the rear header.

According to another preferred embodiment of the present invention, the rear row seat is configured to be a rearmost row seat, there is provided an air conditioning unit at one side of a rear part of the vehicle, and the air conditioning duct extending in the vehicle width direction is coupled to the air conditioning unit via a main air conditioning duct which extends in a substantially vertical direction along a rear pillar disposed at a side of the air conditioning unit provided. Accordingly, a specific structure for connecting the air conditioning duct extending in the vehicle width direction with the air conditioning unit is provided. Further, there can be provided a preferable seat belt device for even a vehicle in which the main air conditioning duct is disposed so as to extend along the rear pillar and thereby it may become rather difficult to locate the retractor in a corner between the roof rail and the rear header.

DETAILED DESCRIPTION OF THE INVENTION

Hereinafter, preferred embodiments will be described referring to the accompanying drawings.

Figure 1:
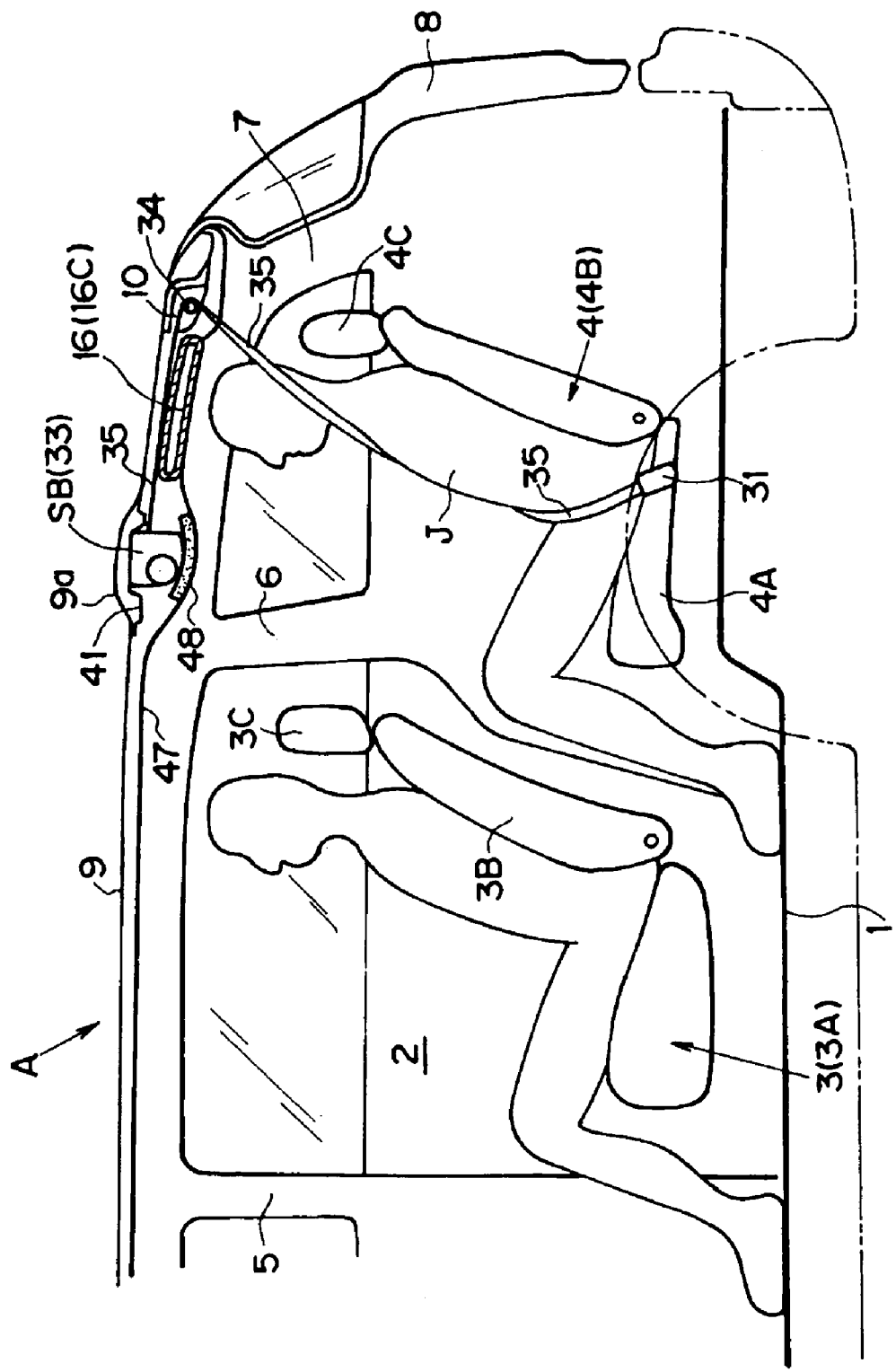
FIG. 1 is a side sectional view showing briefly a rear part of a vehicle according to an embodiment of the present invention.

In FIG. 1, a vehicle A is a 1.5 box type of vehicle (so-called mini van type) and its floor panel is denoted by a reference numeral 1. There are provided a second row seat 3, which is located behind a driver's seat and a passenger seat (not illustrated), and a third row seat 4 as a rearmost row seat, which is located behind the second row seat 3, in a passenger compartment 2 which is formed on a floor panel 1. The second row seat 2 comprises left and right separate seats for two passengers sitting in a vehicle width direction. The second row seat 3 includes a seat cushion 3A, a seat back 3B and a headrest 3C, respectively.

The above-described third row seat 4 is comprised of a bench type of seat, which includes a central seat portion for a passenger sitting at a center, a left seat portion for a passenger sitting at the left side, and a right seat portion for a passenger sitting at the right side. The third row seat 4 includes a seat cushion 4A, a seat back 4B and headrests 4C . . . 4C for three passengers. In FIG. 1, reference numerals 5, 6 and 7 denote respectively a B pillar, a C pillar and a D pillar (rear pillar) which is located in the rearmost position. Further, reference numerals 8 and 9 denote a back door and a vehicle roof (roof panel), respectively. A rear header which constitutes a rear end potion of the vehicle roof 9 is denoted by a reference numeral 10, and a roof rail which constitutes a side edge portion of the vehicle roof 9 is denoted by a reference numeral 11.

Figure 3:
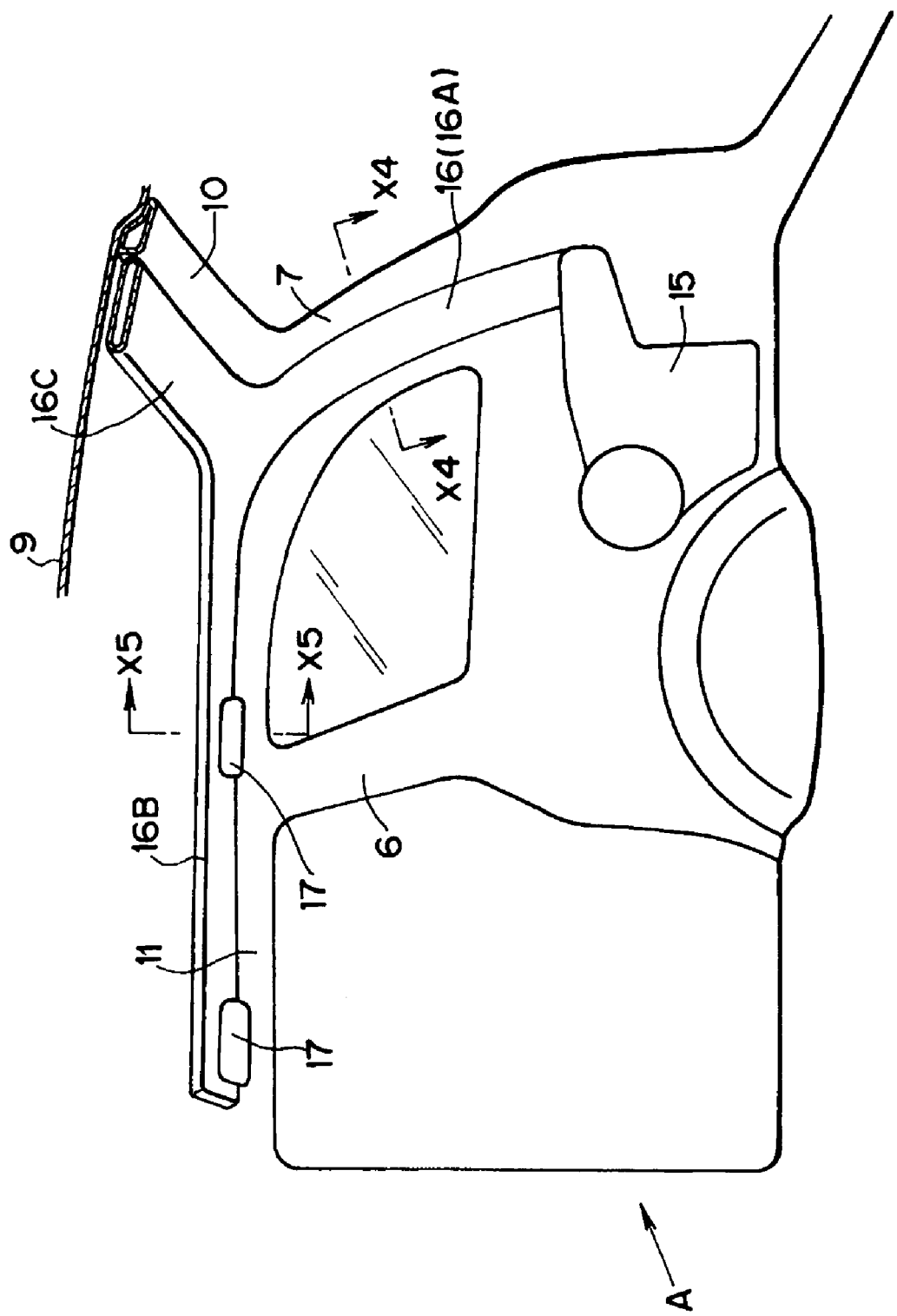
FIG. 3 is a perspective view of a main part showing an air conditioning unit and an air conditioning duct for the rear row seat when viewed from an inside of a vehicle compartment.

As shown in FIG. 3, there is provided an air conditioning unit 15 for passengers on rear seats at a side wall portion of a vehicle body which is located at one side of the vehicle and near a wheel housing 18 for a rear wheel. An air conditioning duct which supplies conditioned air from the air conditioning unit 15 to the passenger compartment 2 is denoted by a reference numeral 16. The air conditioning duct 16 includes a duct portion 16A extending in a vertical direction along the D pillar. The duct portion 16A is coupled to the air conditioning unit 15 at its lower end.

The duct portion 16A bifurcates into two duct portions 16B, 16C at an upper end thereof. The duct portion 16B extends forward along the roof rail 11 extending in a longitudinal direction of the vehicle at one side (a side at which the air conditioning unit 15 is located) of the vehicle roof 9 in the vehicle width direction, and its front end is located at around a front end of the seat cushion 3A of the second row seat 3. Meanwhile, the duct portion 16C extends laterally along the rear header 10, and then it turns at a right angle at the different-side roof rail 11 and extends forward along the roof rail 11. Its front end is also located at around the front end of the seat cushion 3A of the second row seat 3. Respective bifurcated duct portions 16B, 16C are provided with plural blowoff ports 17 . . . 17 for conditioned air at each portion along the roof rail 11.

Figure 4:
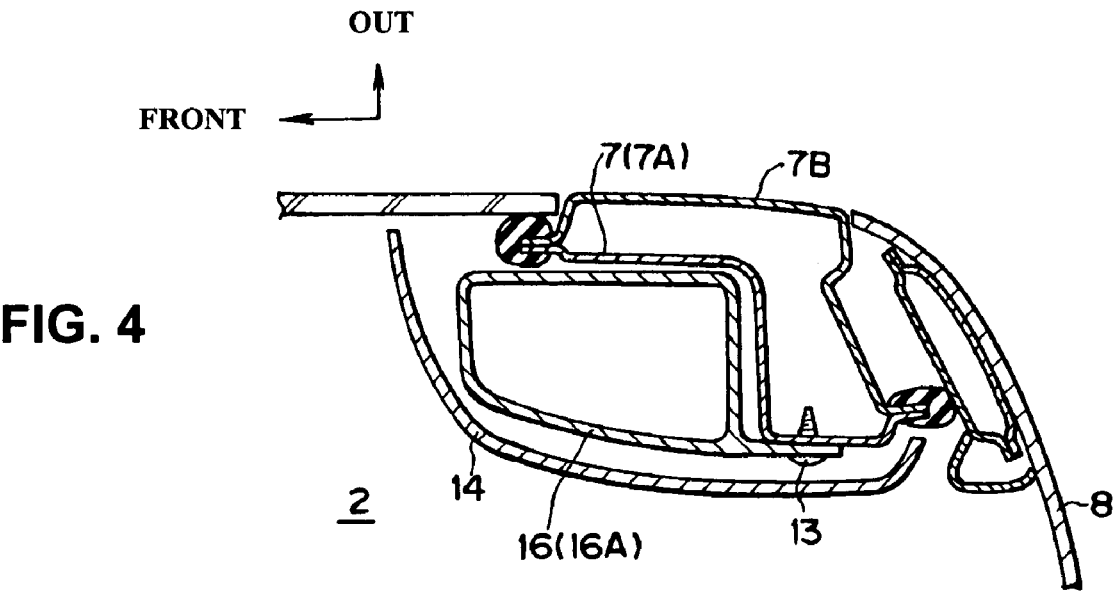
FIG. 4 is a sectional view taken on line X4-X4 of FIG. 3.

A layout structure of the duct portion 16A along the D pillar 7 is illustrated in FIG. 4. The D pillar 7 is formed to be of a closed cross section shape with an inner panel 7A and an outer panel 7B as shown in FIG. 4. There is provided a corner portion having a substantially right angle in the D pillar 7 at an inside of the passenger compartment 2, and the duct portion 16A with its closed cross section is disposed close to and along the above-described corner portion so as to provide little gap between the D pillar 7. The duct portion 16A is fixed to the D pillar 7 by a fastener 13. Herein, the duct portion 16A is covered by a trim member 14 from the inside of the passenger compartment 2 so that it cannot be seen from the passenger compartment 2.

Figure 5:
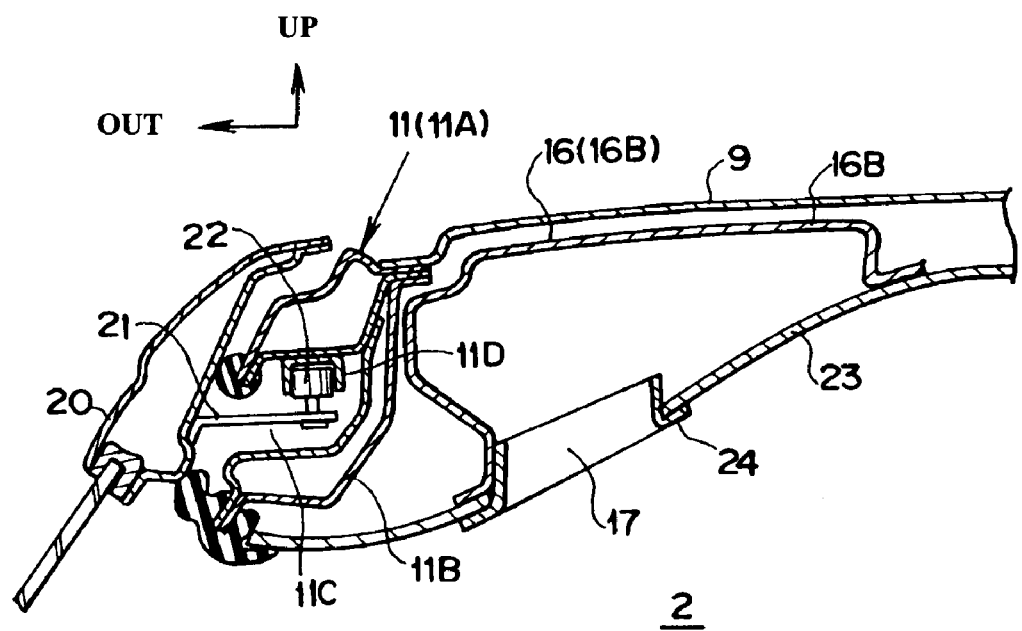
FIG. 5 is a sectional view taken on line X5-X5 of FIG. 3.

A layout structure of the bifurcated duct portion 16B (a part of the bifurcated duct portion 16C extending along the roof rail 11) extending along the roof rail 11 is illustrated in FIG. 5. As shown in FIG. 5, the roof rail 11 has the closed cross section as its normal section, but it has also a guide groove portion 11C for guiding a side door 20 configured as a slide door which moves in the longitudinal direction to open or close for passengers on the rear seats (the second row seat 3 and the third row seat 4). As illustrated in FIG. 5 showing the cross section of the guide grove portion 11C, there are provided a pair of upper and lower closed-section forming members 11A, 11B to constitute the roof rail 11, and the guide groove portion 11C is formed between these members 11A, 11B. A guide rail 11D extending in the longitudinal direction in the guide grove portion 11C is fixed to the closed-section forming member 11A. Further, a guide roller 22 is retained at a bracket 21 which extends from the slide door 20 toward the inside of the vehicle, which is guided by the above-described guide rail 11D.

The duct portion 16B extending in the longitudinal direction is disposed in the corner between the roof 9 and the roof rail 11 with less gap therebetween. The duct 16B is covered by a trim member 23 from the inside of the passenger compartment 2 so that it cannot be seen from the passenger compartment 2. Herein, the duct portion 16B is formed such that its cross section is substantially U-shaped which opens downward. The bottom wall portion of the duct 16B is substantially formed by the above-described trim member 23 except part of the blowoff ports 17 . . . 17 opened downward. The duct portion 16B and the trim member 23 are sealed by an adhesive to prevent conditioned air from leaking therebetween. Herein, the blowoff ports 17 . . . 17 are comprised of short cylindrical trim members 24 . . . 24 which are attached to the trim member 23 by an adhesive.

Figure 6:
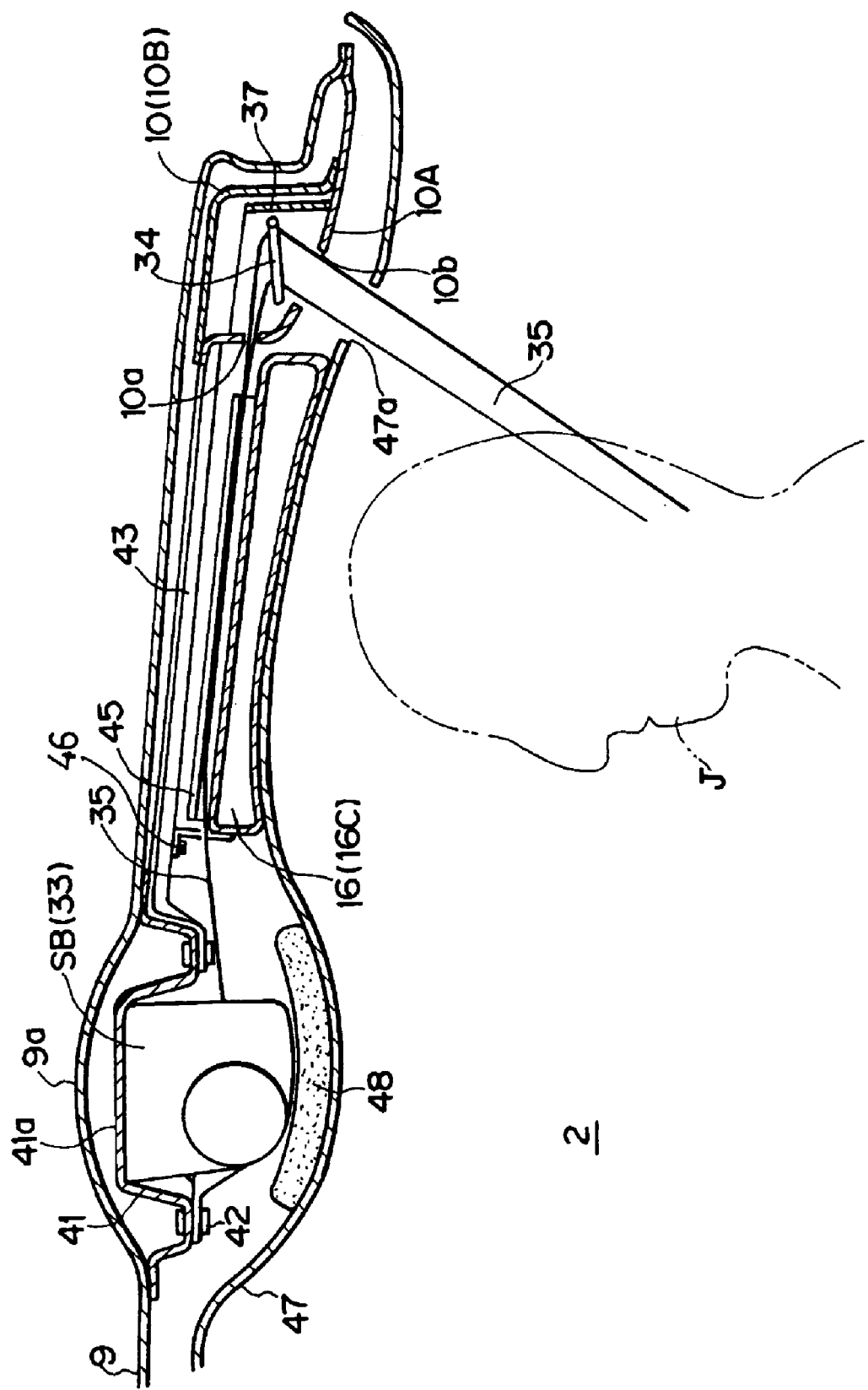
FIG. 6 is a side sectional view showing a detail of a part of the seat belt device for the central seat portion of the rear row seat between a retractor and a seat belt anchor thereof.

Part of the bifurcated duct portion 16C which extends along the rear header 10 is illustrated in FIG. 6. As shown in FIG. 6, the bifurcated duct portion 16C has a closed cross section, and it extends in the vehicle width direction along the rear header 10 and is disposed with a small clearance with respect to the vehicle roof 9. Further, the bifurcated duct portion 16C is covered by a trim member 47 from the passenger compartment 2 so as not to be seen from the passenger compartment 2. Herein, a positional relationship between this part of the bifurcated duct portion extending along the rear header 10 and other members will be described in detail below.

The air conditioning unit 15 blows off conditioned air with preferable moisture, temperature and amount of air out of the plural blowoff ports 17 . . . 17 into the passenger compartment 2 according to an operation of an operating member which is located at a rear part of the passenger compartment but not illustrated here. Herein, cool air and warm air for air-conditioning is supplied to the air conditioning unit 15 via ducts from a front part of the vehicle where a vehicle engine is disposed.

Figure 2:
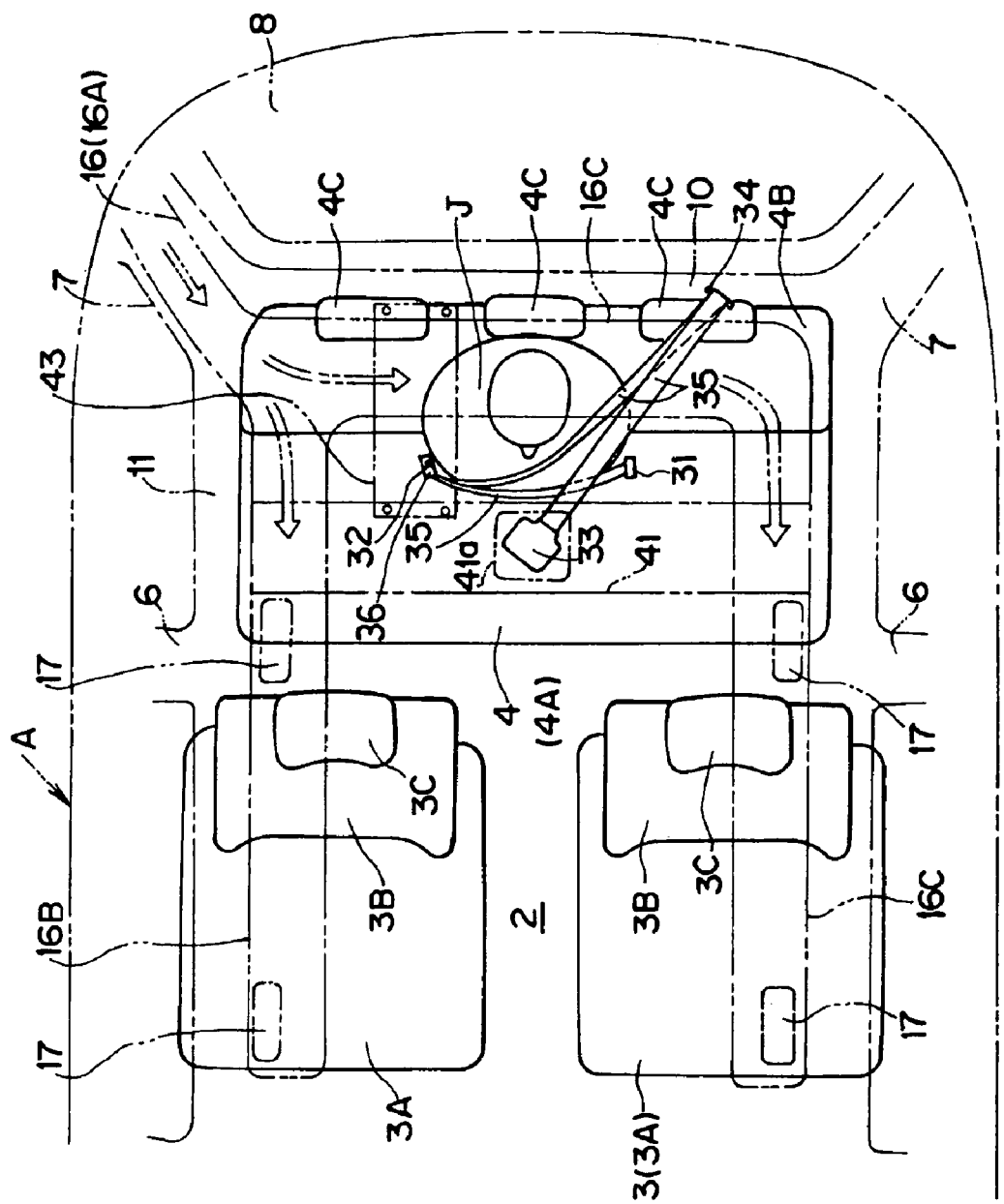
FIG. 2 is a plan view showing briefly a positional relationship between a rear row seat shown in FIG. 1 and a seat belt device for a central seat portion of the rear row seat.

A central passenger sitting on the central seat portion of the third row seat 4 is denoted by a reference numeral J in FIGS. 1, 2 and 6. Firstly, a three-point type of seat belt SB for the central passenger J will be described. The seat belt device SB includes a pair of first and second attaching portions 31, 32 which are disposed at the both sides of the central seat portion of the seat (central passenger J), a retractor 33, a seat belt anchor 34, a seat belt 35, and a tongue 36 as a coupling member. The pair of attaching portions 31, 32 are to be fixing portions at the vehicle body, which are fixed at the vehicle body (floor panel 1) directly or via the seat cushion 4A.

The retractor 33 is attached at the vehicle roof 9 from the side of the passenger compartment 2. Attaching location of the retractor 33 is set at a substantially central portion in the vehicle width direction and before a head portion of the central passenger J (at around a substantially central portion of the seat cushion 4A in the longitudinal direction in the present embodiment). The retractor 33 is located so as not to interfere with a head clearance of any passengers sitting on the second row seat 3 and the third row seat 4. In order to provide such location, the retractor 33 can be located at any portion between the central seat portion of the seat cushion 4A of the third row seat 4 in the longitudinal direction and an upper end portion of the seat back 3B (headrest 3C) in its standing position (in normal using position). Accordingly, it may be located at around a front end of the seat cushion 4A, which is a little forward than that of the illustrated embodiment. And, the location of the retractor 33 in the vehicle width direction may be set at the substantially central portion of the second row seat 3.

Figure 7:
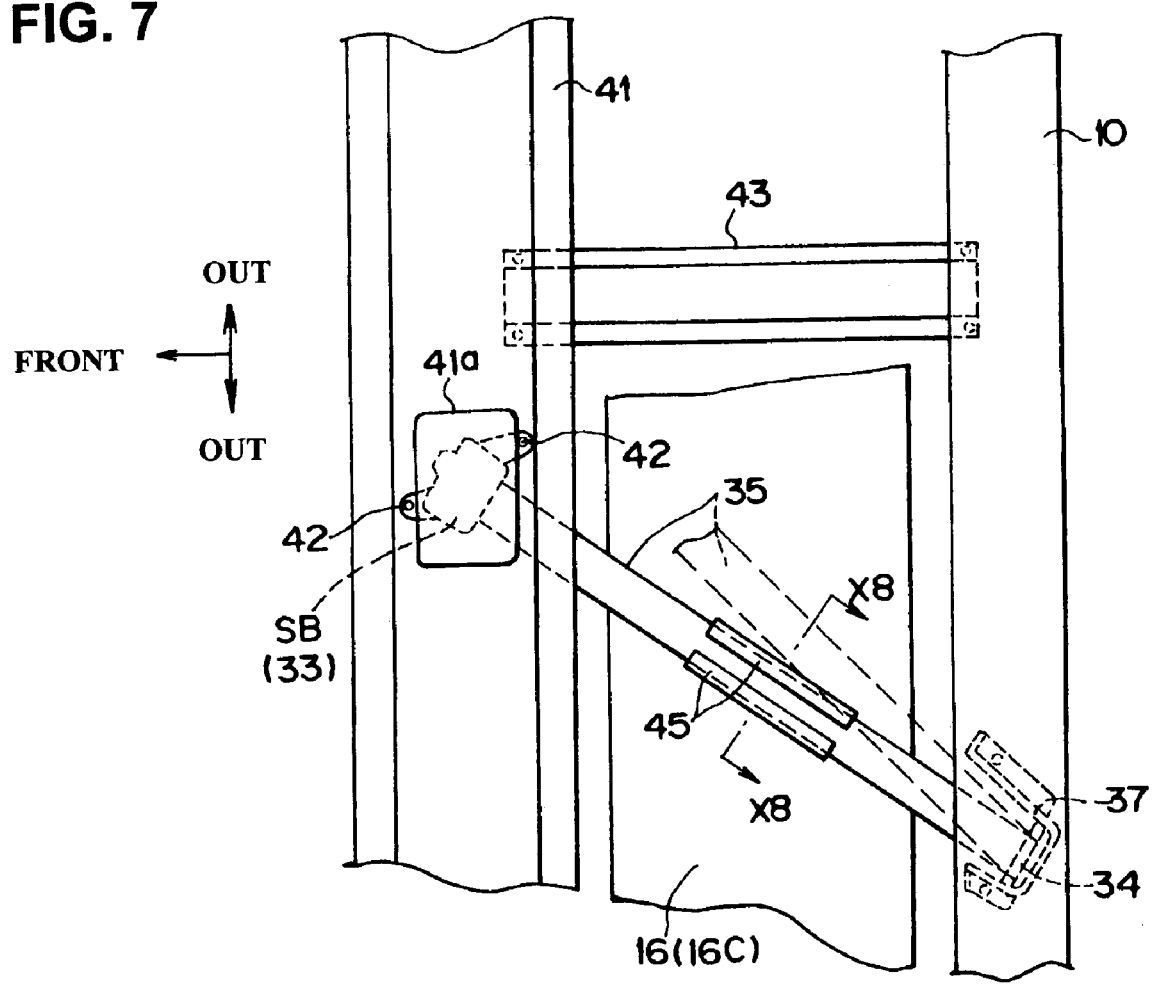
FIG. 7 is a plan view of a main part showing a positional relationship among a rear header, a first reinforcement, a second reinforcement, the air conditioning duct, the retractor, and the seat belt anchor.
Figure 8:
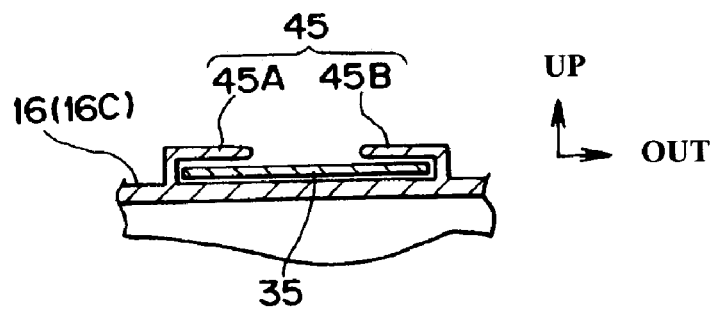
FIG. 8 is a sectional view taken on line X8-X8 of FIG. 3.
Figure 11:
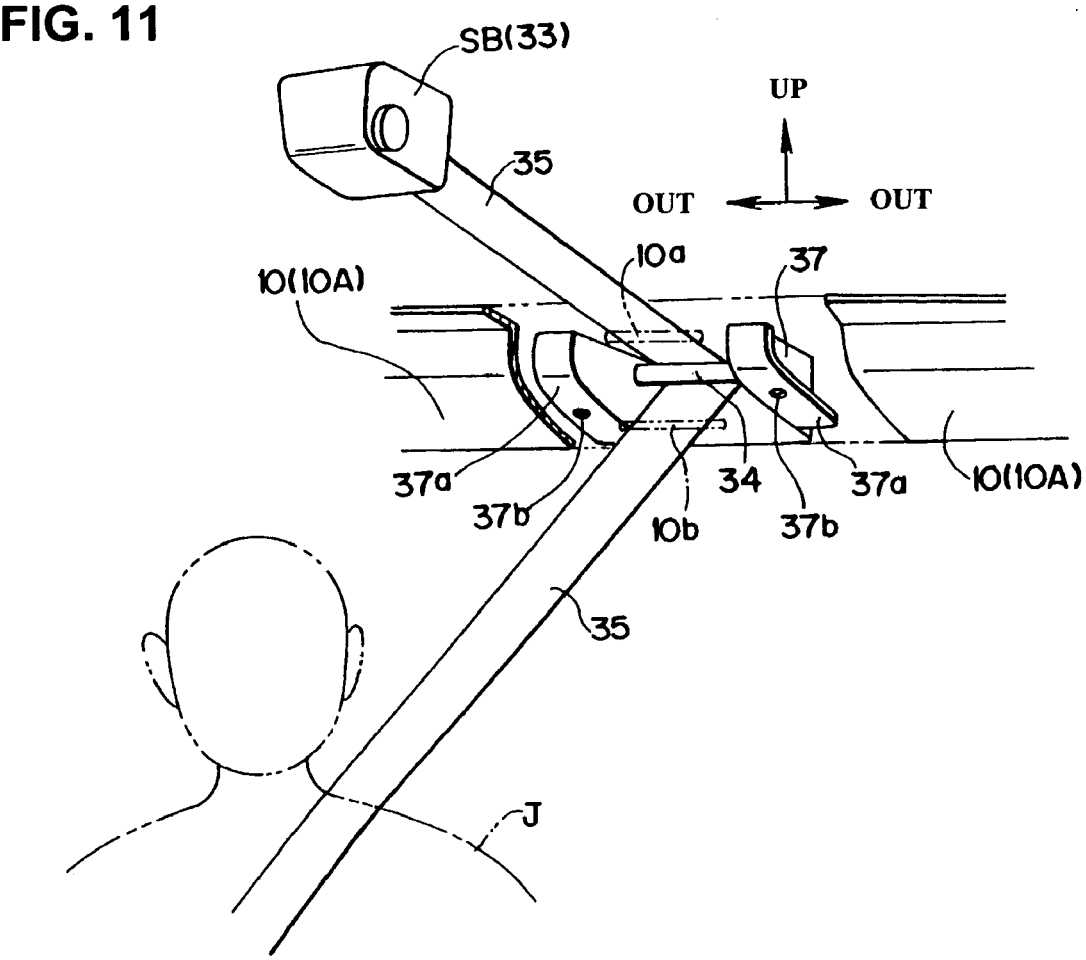
FIG. 11 is a perspective view showing a seat belt extending through the seat belt anchor.

The seat belt anchor 34 is installed in the rear header 10. Namely, the rear header 10 is formed with a closed cross section by an inner panel 10A and an outer panel 10B, and the seat belt anchor 34 which is made of substantially pin-shaped member is disposed in a space of the closed cross section of the rear header 10 (see FIGS. 7, 11 and 12). More specifically, the seat belt anchor 34 is held by an attaching bracket 37 which is attached at the rear header 10. Attaching location of the seat belt anchor 34 is set at an offset portion from the central passenger J in the vehicle width direction. Namely, it is located in substantially the same position as the first attaching portion 31 which is one of the pair of attaching portions 31, 32.

The seat belt 35 is withdrawn from the retractor 33 and extends backward and toward the seat belt anchor 34, and then it returns back at the seat belt anchor 34 toward the passenger compartment 2. A tip of the seat belt 35 extending toward the passenger compartment 2 is fixed at the above-described one of attaching portion 31 normally. The tongue 36 as the coupling member is guided through the seat belt 35 so as to move between the first attaching portion 31 and the seat belt anchor 34. The tongue 36 is coupled detachably to the other second attaching portion 32. A state where the tongue 36 is coupled to the second attaching portion 32 provides a state where the seat belt device SB is installed. A manual operation of a releasing button located at the second attaching portion 32 allows the tongue 36 to be detached from the second attaching portion 32.

Figure 12:
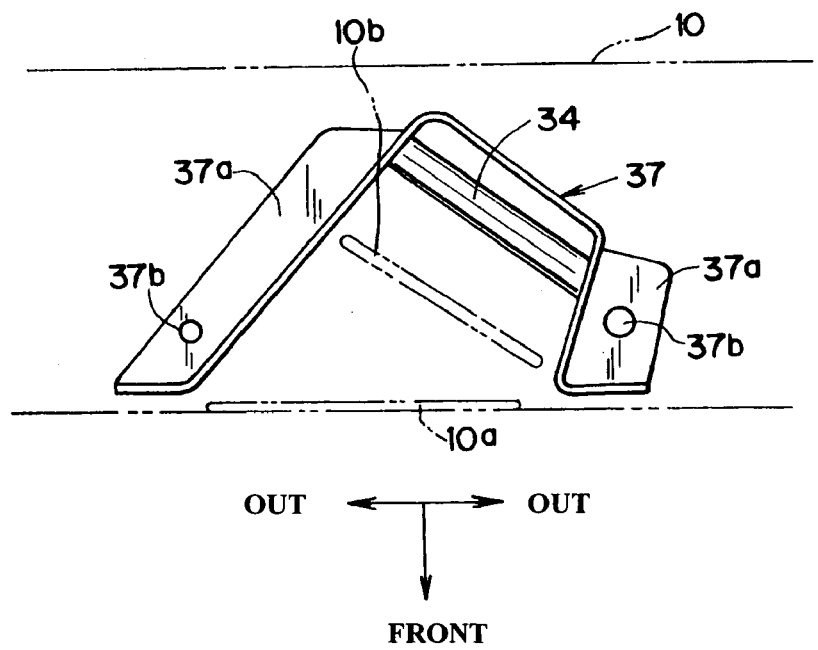
FIG. 12 is a plan view showing the seat belt anchor and an attaching bracket therefore.

The above-described attaching bracket 37 is secured to the inner panel 11A of the rear header 11 by a fixing means, such as bolts, via a flange portion 37a thereof, whose secured portion is denoted by a reference numeral 37b (see FIG. 12). There is provided an inlet opening 10a for receiving the seat belt 35 withdrawn from the retractor 33 into the rear header 10 on the rear header 10 (inner panel 10A) (see FIGS. 6, 11 and 12). Further, there is provided an outlet opening 10b for sending out the seat belt 35 extending via the seat belt anchor 34 on the rear header 10 (inner panel 10A) (see FIGS. 6 and 11). The trim member 47 covering the rear header 10 from the side of the passenger compartment 2 is provided with an opening 47a for guiding the seat belt 34 extending from the seat belt anchor 34 to the passenger compartment 2 (see FIG. 6).

The retractor 33 is located at the central portion in the vehicle width direction, while the seat belt anchor 34 is slightly offset from the central portion in the vehicle width direction to one side of the vehicle. Accordingly, the retractor 33 is disposed obliquely in the vehicle width direction such that the seat belt 35 straightly withdrawn from the retractor 33 is directed to the seat belt anchor 34 (see FIGS. 2 and 7). Further, the seat belt anchor 34 is disposed obliquely in the vehicle width direction such that its axial line crosses the seat belt 35 straightly withdrawn from the retractor 33 at a right angle, so that the seat belt 35 can return back smoothly at the seat belt anchor 34 (see FIGS. 6, 7 and 12).

In a state where the central passenger J is restrained by the seat belt device SB, a lumber portion of the central passenger J is restrained by the seat belt 35 extending between the first attaching portion 31 and the second attaching portion 32. Further, a chest portion of the central passenger J is restrained by the seat belt 35 between the second attaching portion 32 and the seat belt anchor 34.

Figure 9:
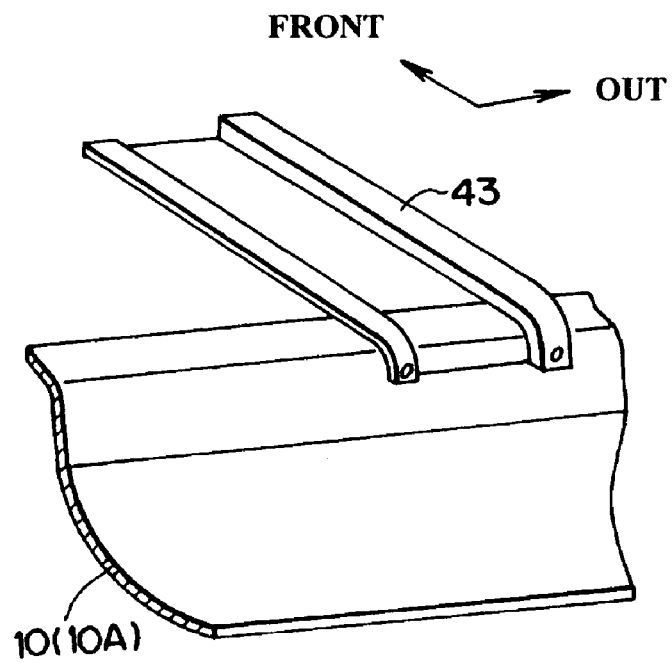
FIG. 9 is a perspective view showing a connecting portion between the second reinforcement and the rear header.
Figure 10:
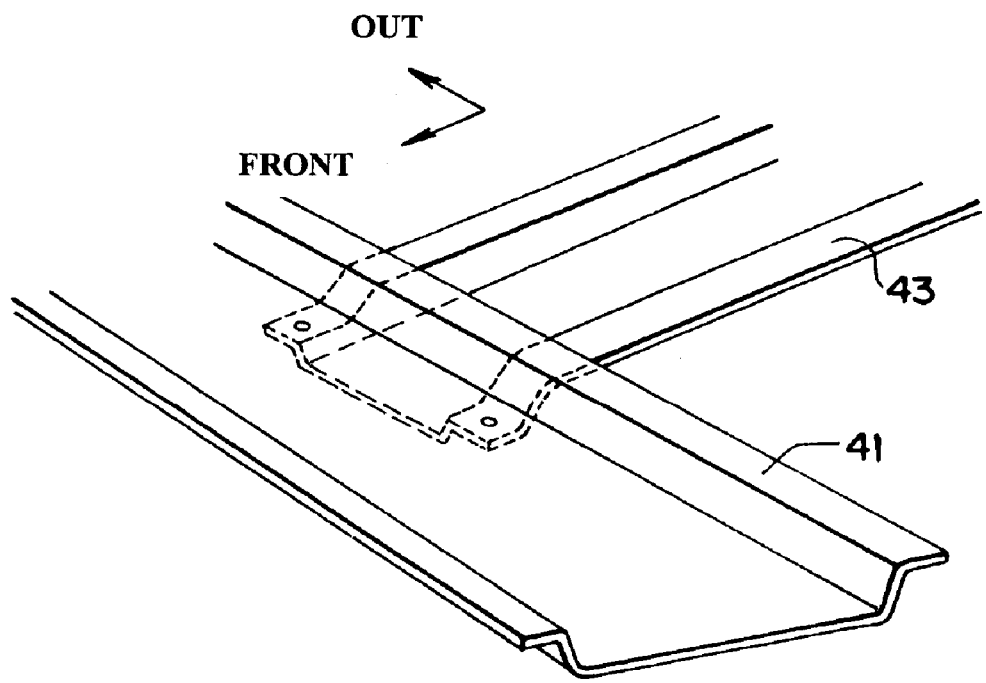
FIG. 10 is a perspective view showing a connecting portion between the first reinforcement and the second reinforcement.

Herein, a particular structure based on the retractor 33 disposed at the vehicle roof 9 will be described referring to FIGS. 6 through 10. A first reinforcement 41 which extends in the vehicle width direction is fixed to a lower face of the vehicle roof 9, which connects the left and right roof rails 11, 11 with each other. The retractor 33 is attached at a lower face of the first reinforcement 41 by a fixing member 42 such as bolts (see FIG. 6). Further, the first reinforcement 41 and the rear header 10 are interconnected by a second reinforcement 43 which extends in the longitudinal direction of the vehicle. A connecting portion of the second reinforcement 43 to the first reinforcement 41 is illustrated in FIG. 10, and a connecting portion of the second reinforcement 43 to the rear header 10 (inner panel 10A) is illustrated in FIG. 9. The reinforcements 41, 43 are formed thinly by metal plates.

The vehicle roof 9 has a protruded portion 9a which projects upward at a portion thereof where the retractor 33 is located (see FIGS. 1 and 6). The first reinforcement 41 has also a protruded portion 41a projecting upward partially corresponding to the protruded portion 9a (see FIGS. 6 and 7). The protruded portion 41a projects in the protruded portion 9a of the vehicle roof 9. An upper portion of the retractor 33 is located (stored) in the protruded portion 41a of the first reinforcement 41. Accordingly, the retractor 33 can be located in a higher position so as to provide an enough head clearance.

The second reinforcement 43 extending in the longitudinal direction is disposed so as to be slightly offset from the center of the vehicle in the vehicle width direction. More specifically, the second reinforcement 43 is offset from the retractor 33, i.e., the center of the vehicle, toward a side which is opposite to where the seat belt anchor 34 (first attaching portion 31) is disposed. Accordingly, interference of the seat belt 35, which is located between the retractor 33 and the seat belt anchor 34, with the second reinforcement 43 can be prevented. FIG. 6 shows that the seat belt 35 between the retractor 33 and the seat belt anchor 34 is located under the second reinforcement 43. This is just because an existence of the second reinforcement 43 is illustrated apparently. Instead, the seat belt 35 between the retractor 33 and the seat belt anchor 34 may be located at substantially the same level as the second reinforcement 43.

The seat belt 35 between the retractor 33 and the seat belt anchor 34 is disposed so as to extend over the bifurcated duct portion 16C along the rear header 11. The seat belt 35 between the retractor 33 and the seat belt anchor 34 is guided by a guide portion 45 which is formed on an upper face of the bifurcated duct portion 16C (see FIGS. 7 and 8). Namely, the guide portion 45 includes a pair of guide projecting portions 45A, 45B which project from the upper face of the bifurcated duct portion 16C and have substantially L-shaped cross sections, and the seat belt 35 between the retractor 33 and the seat belt anchor 35 is interposed between the pair of guide projecting portions 45A, 45B so as to slide in it. Accordingly, the seat belt 35 between the retractor 33 and the seat belt anchor 35 can be prevented from moving in a vertical direction or in a lateral direction from a imaginary straight line getting through the retractor 33 and the seat belt anchor 35.

The above-described rear header 10, the part of the bifurcated duct portion 16C extending along the rear header 11, the retractor 33, the first reinforcement 41 and the second reinforcement 43 are covered by the above-described trim member 47 from the inside of the passenger compartment 2. The trim member 47 is contacted with the bifurcated duct portion 16C (fixed to the lower face of the bifurcated duct portion 16C by an adhesive), but it is located below the retractor 33 with a gap. There is provided a shock absorbing member 48 which is made of resilient member, such as sponge or rubber, in a space between the retractor 33 and the trim member 47. The shock absorbing member 48, for example, is attached to the lower face of the retractor 33 by an adhesive so as not to move relatively with respect to the retractor 33. Accordingly, even if the passenger stands up toward the retractor 33 imprudently, the head of the passenger can be properly protected by the shock absorbing member 48.

Although exemplary embodiments were described above, the present invention should not be limited to these. For example, the retractor 33 may be attached at the vehicle roof 9 directly, not via the reinforcement. Further, the seat belt anchor 34 may be located outside the rear header 11. The seat belt device according to the present invention can be also applied to a central passenger sitting on a central portion of the second row seat 3. Further, the central passenger to which the seat belt device according to the present invention is applied may be two central passengers or more who sit on two central portions or more of a row seat except the rightmost and leftmost portions in the case where the row seat is available for four passengers or more (namely, the central passenger is considered as two central passengers sitting on the seat which is available for four passengers). When a vehicle has only two row seats, the present invention can be applied to a central passenger sitting on the second row seat. When a vehicle has four row seats or more, of course, the present invention can be applied to any central passengers on the second row seat and/or others behind the second row seat. Further, the vehicle roof 9 does not necessarily need the above-described protruded portion 9a at a portion corresponding to the retractor 33.

Further, the air conditioning duct extending in the vehicle width direction may be coupled to an air conditioning unit which is disposed at a front portion of the vehicle body, for example, via an air conditioning duct extending in the longitudinal direction along the roof rail (in this case, there is no need to provide an air conditioning duct along the rear pillar), instead of the one coupled to the air conditioning unit which is disposed at the rear portion of the vehicle body via the duct portion 16A (main duct portion) disposed along the rear pillar. Also, the air conditioning duct extending in the vehicle width direction may be supported on the second reinforcement 43. As a support of the air conditioning duct on this reinforcement, a fixing member such as a bolt may be used for attaching the air conditioning duct at the reinforcement, or a winding member such as a belt may be also used. Any other supporting means can be used as long as a weight of the air conditioning duct can be properly supported by the reinforcement.

The part of the air conditioning duct 16 extending in the vehicle width direction may be also formed with a cross section which opens downward without a bottom wall thereof, and its lower may be covered by the roof trim 47. Further, the air conditioning duct extending in the vehicle width direction may be supported by the reinforcement 43. FIG. 6 illustrates a case where the air conditioning duct is fixed at the reinforcement 43 by the bolt 46.

Objects of the present invention should not be limited to what was described explicitly here. Instead, to provide anything which was described substantially as preferable or advantageous ones should be included implicitly in objects of the present invention. Also, the present invention can be described in a process one.

What is claimed is:

1. A seat belt device for a vehicle, in which there are provided a vehicle roof, a pair of left-and-right roof rails that extend in a longitudinal direction of the vehicle and constitute left-and-right side edge portions of the vehicle roof, and a rear header that constitutes a rear edge of the vehicle roof, comprising:

a rearmost row seat disposed in a vehicle compartment, the rearmost row seat being available for plural passengers sitting in a vehicle width direction and including a central seat portion for a passenger sitting in a central position thereof; and a seat belt device disposed for said passenger sitting on the central portion of said rearmost row seat, the seat belt device including a seat belt, a retractor for winding up the seat belt, and a seat belt anchor which the seat belt withdrawn from the refractor extends through;

wherein a first reinforcement is provided below the vehicle roof so as to extend in a vehicle width direction and connect to the left-and-right roof rails at both ends thereof, the first reinforcement being located between a headrest of the rearmost row seat in a normal-use upright position and a headrest of a forward row seat in a normal-use upright position that is disposed in front of the rearmost row seat in the longitudinal direction of the vehicle, said retractor is fixed to said first reinforcement, said seat belt anchor is fixed to said rear header, and a second reinforcement is provided below the vehicle roof so as to extend in the longitudinal direction and connect said first reinforcement with the rear header.

2. The seat belt device for a vehicle of claim 1, wherein said vehicle roof is protruded upward partially and said retractor is located in a space formed below the protruded portion of the vehicle roof.

3. The seat belt device for a vehicle of claim 1, wherein said retractor is disposed obliquely such that the seat belt straightly withdrawn from said refractor is inclined with respect to the vehicle width direction.

4. The seat belt device for a vehicle of claim 1, wherein said refractor is disposed obliquely such tat the seat belt withdrawn from said refractor is inclined with respect to the vehicle width direction, and said second reinforcement is disposed at a side which is opposite to a side where the seat belt is withdrawn with respect to said retractor.

5. The seat belt device for a vehicle of claim 1, wherein there is provided a roof trim which covers said retractor from an inside of the vehicle compartment.

6. The seat belt device for a vehicle of claim 5, wherein there is provided a shock absorbing member between said roof trim and said retractor.

7. The seat belt device for a vehicle of claim 1, wherein said retractor is disposed at a substantially central portion in the vehicle width direction, said seat belt anchor is disposed offset from a vehicle center in the vehicle width direction, and the seat belt withdrawn from said retractor is inclined with respect to the vehicle width direction so as to be directed to said seat belt anchor.

8. The seat belt device for a vehicle of claim 7, wherein said seat belt device for said passenger sifting on the central portion of said rearmost row seat includes a first attaching portion and a second attaching portion as fixing portions to a vehicle body, the first and second attaching portions are disposed respectively at both sides of said central seat portion of said rearmost row seat in the vehicle width direction, the first attaching portion is located at a side of said seat belt anchor and the second attaching portion is located at an opposite side to said seat belt anchor, a tip of the seat belt which is withdrawn from said refractor and extends through said seat belt anchor is connected with said first attaching portion normally, and a coupling member which is guided through the seat belt and capable of moving between said seat belt anchor and said first attaching portion is coupled detachably to said second attaching portion.

9. The seat belt device for a vehicle of claim 1, wherein there is provided a trim member which covers said retractor and said first and second reinforcements from an inside of the vehicle compartment.

10. The seat belt device for a vehicle of claim 1, wherein there is provided an air conditioning duct which extends in the vehicle width direction between said retractor and the rear header.

11. The seat belt device for a vehicle of claim 10, wherein the seat belt withdrawn from said retractor is disposed so as to extend between the vehicle roof and said air conditioning duct.

12. The seat belt device for a vehicle of claim 11, wherein there is provided a guide portion for guiding the seat belt withdrawn from said retractor on an upper face of said air conditioning duct.

13. The seat belt device for a vehicle of claim 10, wherein there is provided a trim member which covers said retractor and said air conditioning duct from an inside of the vehicle compartment.

14. The seat belt device for a vehicle of claim 13, wherein there is provided a shock absorbing member between said retractor and said trim member.

15. The seat belt device for a vehicle of claim 10, wherein there is provided an air conditioning unit at one side of a rear part of the vehicle, and said air conditioning duct extending in the vehicle width direction is coupled to said air conditioning unit via a main air conditioning duct which extends in a substantially vertical direction along a rear pillar disposed at a side of said air conditioning unit provided.

* * * * *